United States Patent [19]

Bertolini

[11] 4,226,189

[45] Oct. 7, 1980

[54] VEHICLE SIDEWALL AND ROOF CONSTRUCTION

[76] Inventor: William A. Bertolini, 115-65 Undercliff Ter., Kinnelon, N.J. 07405

[21] Appl. No.: 887,949

[22] Filed: Mar. 20, 1978

[51] Int. Cl.² .......................................... B61D 17/18
[52] U.S. Cl. ................................. 105/423; 296/210; 105/392
[58] Field of Search .............. 296/137 R, 31 R, 39 R, 296/28 M, 28 K, 28 L, 193–196, 191, 202, 137; 105/378, 379, 423, 424, 425

[56] References Cited

U.S. PATENT DOCUMENTS

| | | | |
|---|---|---|---|
| 2,348,579 | 5/1944 | Solis | 296/137 |
| 3,021,171 | 2/1962 | Barenyi | 296/137 |
| 3,033,130 | 5/1962 | Erickson | 105/423 |
| 3,133,658 | 5/1964 | Frevjman | 105/423 |
| 4,007,567 | 2/1977 | Mooney et al. | 296/193 |

Primary Examiner—Richard A. Bertsch
Attorney, Agent, or Firm—Max R. Millman

[57] ABSTRACT

A vehicle body or intermodal container whose sidewalls comprise modular steel, aluminum or plastic panels bonded to plywood and whose roof comprises a continuous metal or plastic sheet substantially coextensive with the body bonded to plywood. The construction is economical, structurally sound, esthetically attractive and not prone to occasional damage, watertight and reparable in the field without resort to welding.

13 Claims, 6 Drawing Figures

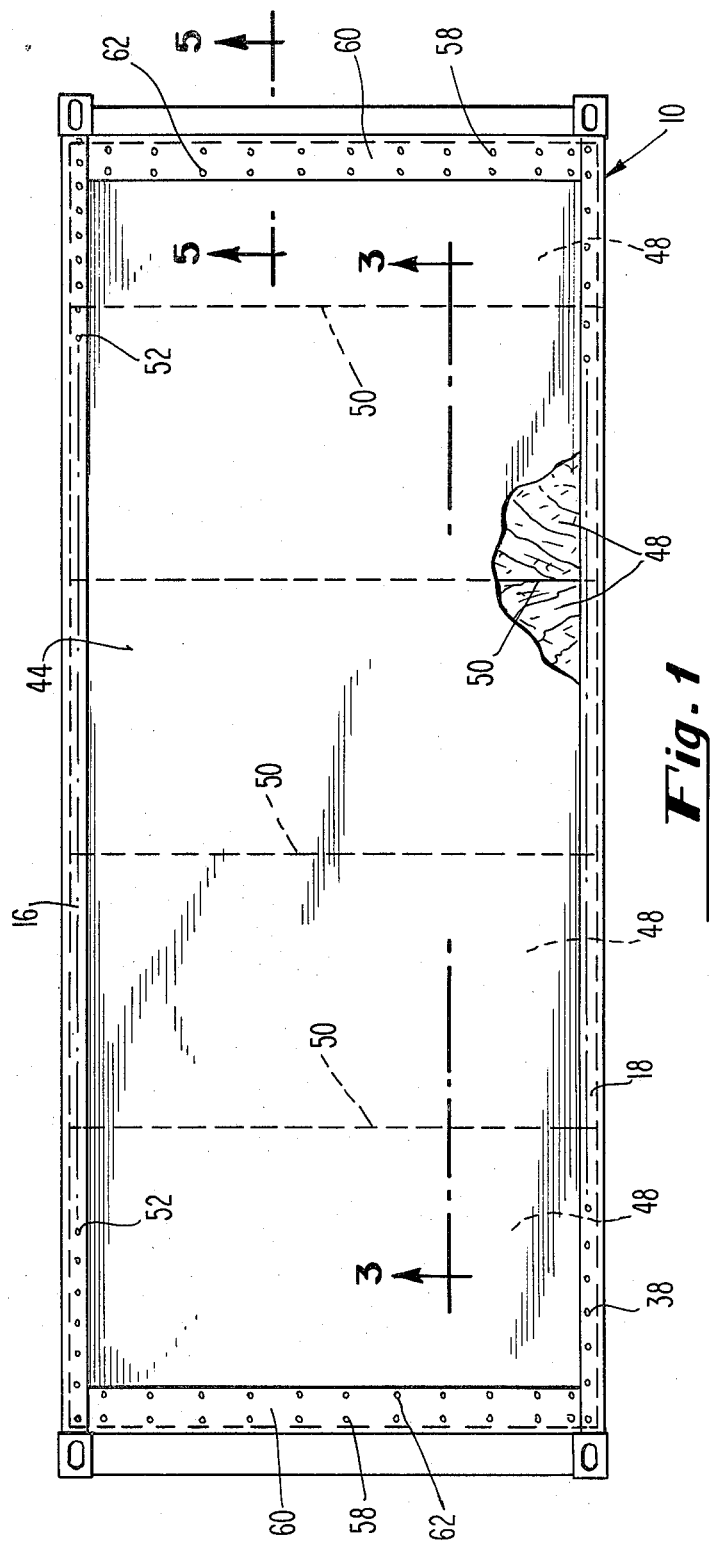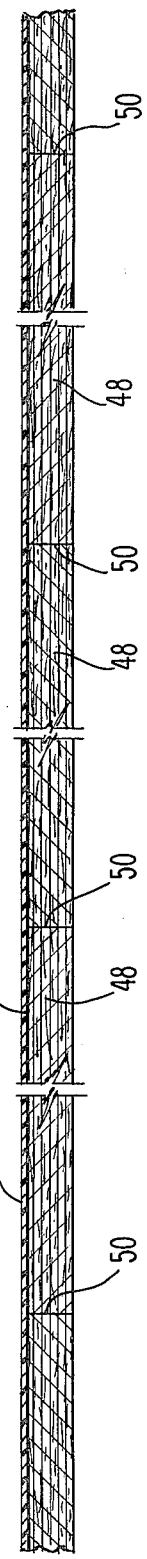

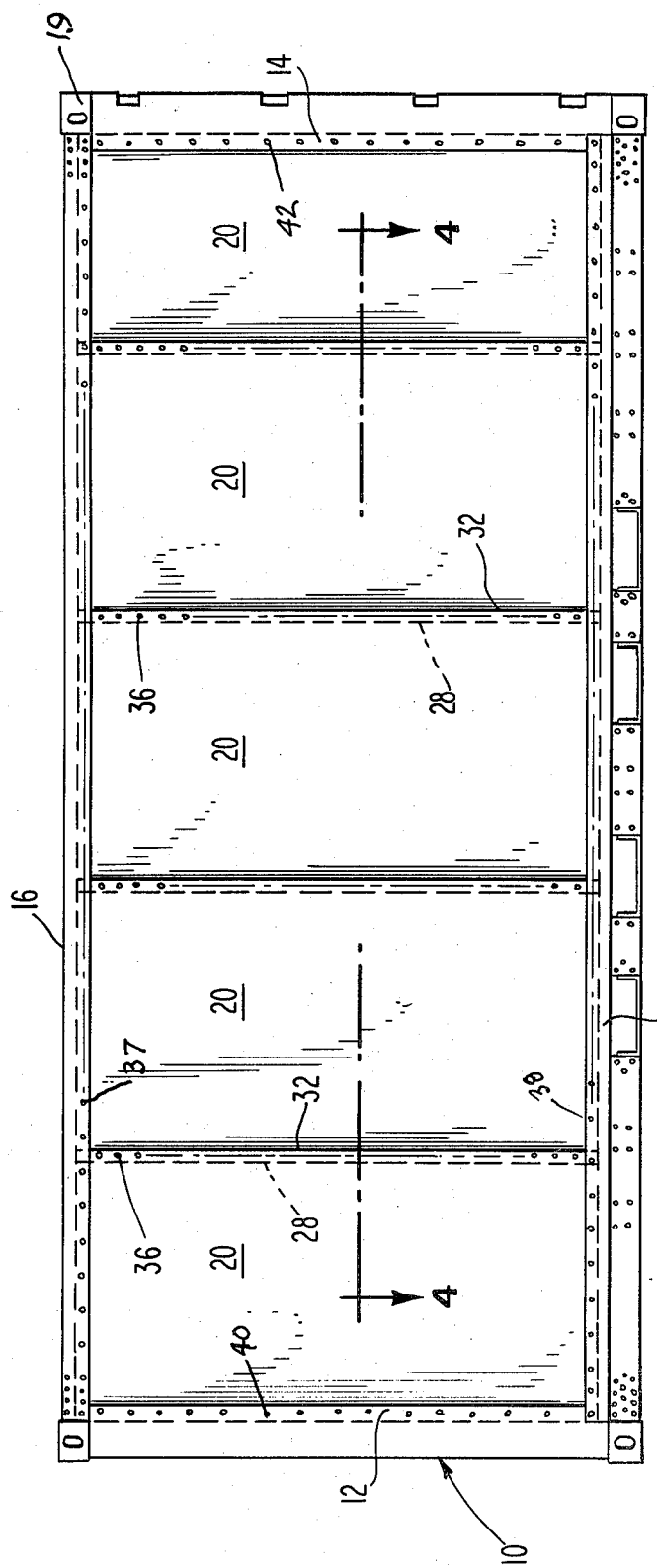
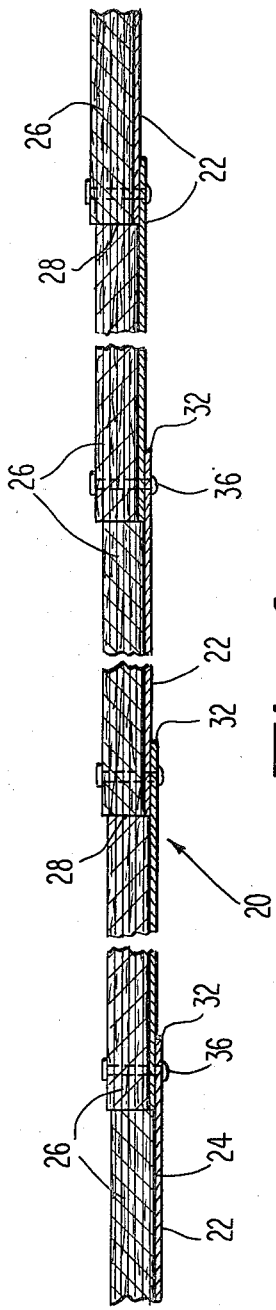

VEHICLE SIDEWALL AND ROOF CONSTRUCTION

This invention relates to the sidewall and roof construction of a vehicle such as an intermodal container, a truck body, truck trailer and the like.

Currently, vehicle bodies, particularly intermodal containers, are of three types, all steel, post and sheet aluminum and fiberglass reinforced plastic over plywood, known in the trade as FRP plywood.

Although the first type, namely, the all steel container, has the advantage of low initial cost, it has the disadvantages of vulnerability to damage and excessive tare weight, and, to minimize weight, the sidewall and roof sheets are sometimes made of corrugated steel panels welded to the frame. To be watertight, steel containers require extensive welding.

The second type of container employs sidewalls made of sheet aluminum with longitudinally spaced vertical posts, either aluminum on the outside or, alternatively, steel or aluminum on the inside. While this aluminum body has the advantages of light weight and of being reparable in the field without requiring welding equipment, it has the disadvantages of high initial cost and excessively high maintenance cost.

The third type employs sidewalls made of a laminate of fiberglass reinforced plastic bonded to plywood, essentially a one-piece sidewall approximately $\frac{3}{4}$ to 1 in. thick and secured to steel end frames and steel or aluminum top and bottom rails. While this construction has the advantages of low maintenance cost and excellent resistance to occasional damage, it has the disadvantages of initial high cost and the weight is generally lighter than steel but heavier than aluminum.

The primary object of this invention is to provide a vehicle body or intermodal container construction which overcomes the disadvantages of the aforementioned three types of vehicle construction and intermodal container body constructions by combining the low maintenance and excellent resistance to damage of the FRP construction with the lower initial cost of steel and the reparability of aluminum.

Another object is to provide a vehicle body or intermodal container sidewall construction comprised of steel panels of relatively thin guage bonded to plywood and joined vertically by means excluding the conventional outer or inner posts and which can be easily laid up to form a complete side of the body for ease of assembly.

Another object is to provide a vehicle body or intermodal container sidewall construction of the character which, because of the backing provided by external steel bonded on internal plywood construction, is not prone to occasional damage and, if it is damaged, the same can be repaired mechanically by patching or replacing in the field with hand tools and without the use of welding which ruins the original surface preparation and coating materials in the welding area thereby causing rusting in a relatively short time.

Another object is to provide a steel-plywood sidewall construction of the character described which is weather resistant and cosmetically appealing as the paint finish is applied to the steel after it has been protected by a hot dipped galvanizing process. Alternately, aluminum or plastic sheeting can be bonded to the plywood.

Another object is to provide a vehicle body or intermodal container sidewall construction of the character described wherein the internal plywood completely lines the inside of the body thereby providing a degree of thermal insulation and thus eliminating internal sweating and also providing smoothness for loading cargo.

Heretofore, roofs of vehicle bodies or intermodal containers were made of individual metal sheets riveted to each other and to roof bows which was a source of leakage. One-piece aluminum roof sheets, supported by transverse roof bows, were also used.

An important object of this invention is to provide a roof for a vehicle body or intermodal container which eliminates the riveted connection between sheets and, instead, uses a single continuous water-resistant sheet substantially coextensive with the body.

Another object is to provide a roof construction of the character described in which the one-piece continuous roof sheet is comprised of relatively thin aluminum bonded to individual pieces of plywood or an FRP skin bonded to the plywood pieces or a plastic laminate bonded to plywood which is weather tight, the plywood providing the structural integrity and thereby eliminating the need for roof bows.

These and other objects of the invention will become more apparent as the following description proceeds in conjunction with the accompanying drawings wherein:

FIG. 1 is a plan view of an intermodal container made in accordance with the instant invention;

FIG. 2. is a front elevational view of the intermodal container;

FIG. 3 is a longitudinal sectional view taken on the line 3—3 of FIG. 1;

FIG. 4 is a sectional view taken on the line 4—4 of FIG. 2;

Specific reference is now made to the drawing in which similar references are used for corresponding elements throughout.

Figure 5:
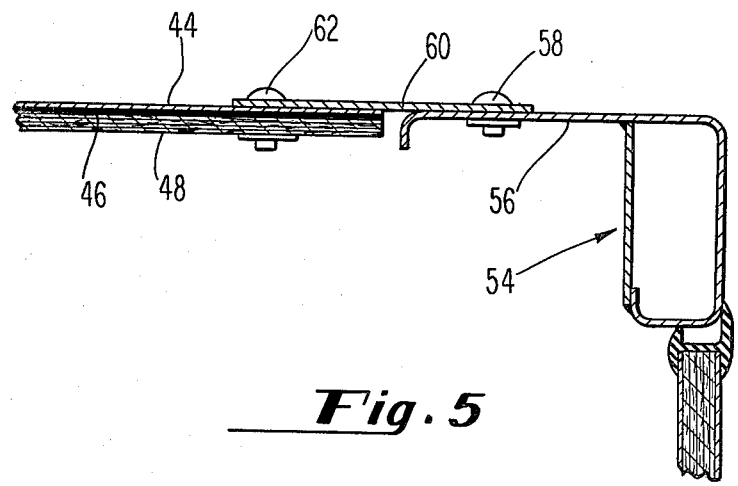
FIG. 5 is a sectional view of FIG. 2 taken on the line 5—5 illustrating the corner construction.
Figure 6:
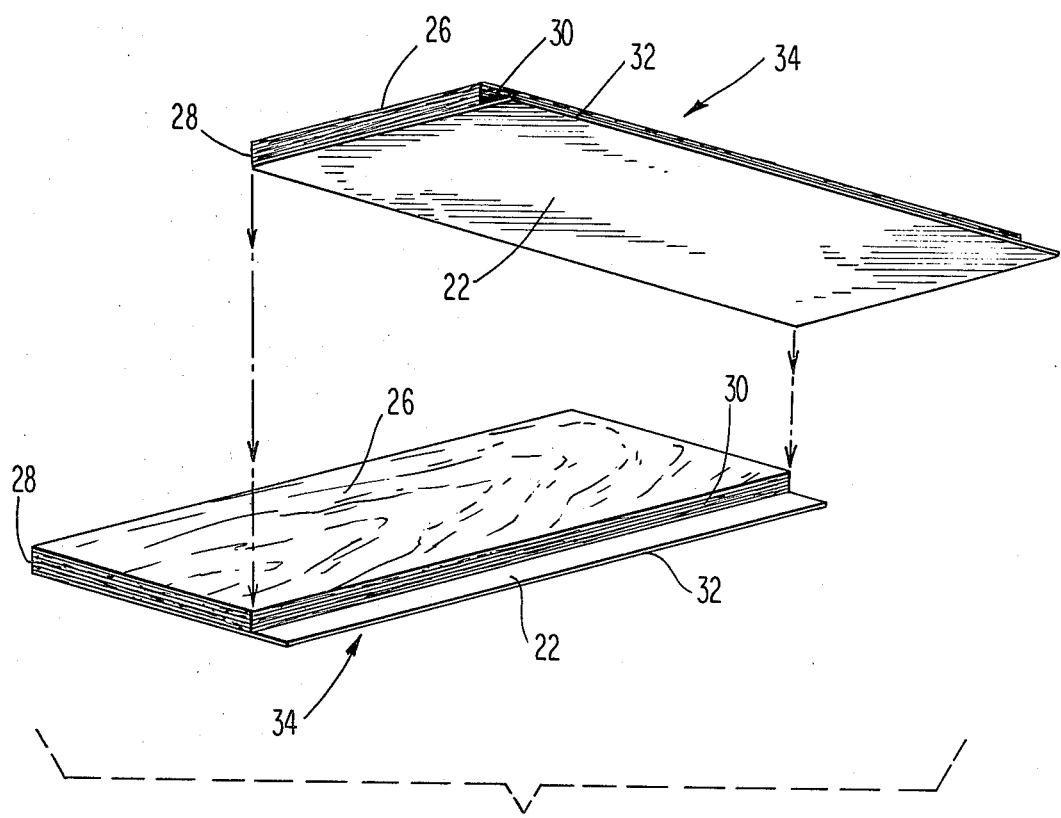
FIG. 6 is an exploded perspective view showing the connection between the side panels of the sidewall.

Indicated generally at 10 is an intermodal container which, but for the sidewall and roof construction of the instant invention, is conventional in that it contains front and rear, generally steel, substantially rectangular vertically disposed end frames 12 and 14 interconected by top and bottom steel or aluminum rails 16 and 18 and corner ISO castings 19 carried by the end frames. The flooring (not shown) is conventional and extends between the end frames and the bottom rails and forms no part of the invention.

The sidewall construction, which does not employ vertical posts, comprises modular panels 20 of external steel, aluminum or plastic 22 bonded as at 24 to internal plywood 26. The steel, which may be hot dipped, galvanized and pre-painted, will be of relatively thin guage in the order of magnitude of about 0.0024 in. thick and the plywood in the order of magnitude of about $\frac{3}{4}$ in. thick. Each panel will be about 48 in. wide and as high as the container.

Various adhesives, thermoplastic and thermosetting and applicable as contact or heat and time and/or pressure cured compositions may be employed as set forth in the Encyclopedia of Polymer Science & Technology, Vol. 1, p. 500 and 542–545, Interscience Publishers, New York, which is herein incorporated by reference.

Non-limitative examples of commercially available adhesives for bonding the aluminum to the plywood are Hy-Bond 56 and 90, a neoprene based contact cement marketed by Pierce and Stevens Chem. Corp. of Buffalo, N.Y., Con-Bond 773-40, a similar contact cement marketed by Columbia Cement Co. of Freeport, N.Y., and DER 331, an epoxy cross-linkable adhesive marketed by Dow Chemical Co. of Midland, Mich.

Each side panel includes a front edge 28 in which the steel plate 22 is flush with the plywood 26. However, the rear edge is of step construction in that the edge 30 of the plywood is set back from the free edge 32 by about 1 ½ in. thereby forming an L-shaped recess 34. As indicated in FIG. 4, the front free edge 28 of one panel is engaged in the L-shaped recess 34 of the rear of an adjacent panel for the full length of the body to form a lap joint, and appropriate mechanical fasteners 36 are made to extend through the lap joint which goes through two sheets of steel 22 and one sheet of plywood 26. The fasteners 36 may be of the type containing large flush heads on both sides with the driving action being obtained from the inside.

Because of this construction, the individual panel sections 20 can be laid up to form a complete side, to minimize assembly costs, and secured top and bottom as at 37 and 38 to the top and bottom rails and as at 40 and 42 to the front and rear frames 12 and 14. The front and rear end walls of the container are made of the same aluminum-plywood panels adhesively joined and interconnected in the same manner as the sidewalls shown and described hereinbefore but preferably of heavier guages for both the aluminum and plywood.

Coming now to the roof, the same comprises a one-piece continuous external sheet 44 substantially coextensive with the length and width of the container vehicle body and bonded as at 46 to internal standard plywood pieces 48 equal in length to the width of the container and about 4 ft. wide. The transverse edges of the plywood pieces abut as at 50 and the side edge portions of the roof sheet 44 are fastened as at 52 to the top rails 16. In conventional fashion, the front and rear headers 54, see FIG. 5, include horizontal flange portions 56 which are secured by appropriate fasteners 58 to a narrow horizontal plate 60 that is, in turn, connected by appropriate fasteners 62 to the roof sheet and bonded plywood.

It is preferred that the one-piece seamless roof sheet or skin 44 be made of aluminum in the order of magnitude of about 0.020 to 0.040 in. thick, in which case the same metal to wood adhesives described hereinbefore will be used.

However, for economy sake and to maintain the same water-impervious character of the roof, the roof sheet or skin 44 can be a sheet of fiberglass reinforced plastic in the order of magnitude of about 0.090 to ⅛ in. thick. General purpose resins are employed to embed fiberglass and cause it to adhere to plywood, and one non-limitative example of such a general purpose resin is commercially available as general resin No. 92347 from Reichhold Chemical Co. of Elizabeth, N.J., which comprises a polymer of propylene glycol, maleic anhydride, phthalic anhydride and styrene monomer and curing promoters. Plastic laminates other than fiberglass reinforced plastic can be used as a one-piece continuous roof sheet or skin, such as a high quality linoleum in which case the same contact or heat and/or time curable adhesives may be used to bond it to the plywood panels. See the chart on p. 500 of Vol. 1 of the aforementioned Encyclopedia of Polymer Science and Technology which indicates the selection of various adhesives to join different substrates.

It should be understood that while the foregoing sidewall and roof construction has been shown and described with reference to a conventional intermodal container, the same is applicable to other freight vehicle bodies such as trucks and trailers, in which case the roof and sidewalls will be secured to the front and rear frames and top and bottom rails normally used in such truck bodies.

Thus, it will be seen that a vehicle body is provided that eliminates leakage through the roof, reduces sweating because of the insulating properties of the entire inner surface of plywood, that uses no vertical posts along the sidewalls or roof bows and which is capable of being manufactured and assembled economically.

What is claimed is:

1. A vehicle body including sidewalls and a roof, each sidewall including modular vertical panels of predetermined width and height substantially equal to that of the body, each panel including an outermost sheet adhesively secured to an innermost stiffening wood product sheet and means directly connecting said panels at their adjacent vertical edges wherein said roof comprises innermost wood product boards of width and length equal to the width of the body and an outermost water-impervious continuous one-piece seamless roof skin substantially coextensive with the body and adhesively secured to said boards.

2. The combination of claim 1 wherein said outermost sheet is steel.

3. The combination of claim 1 wherein said outermost sheet is aluminum.

4. The combination of claim 1 wherein said outermost sheet is plastic.

5. The combination of claim 1 wherein said roof skin is made of aluminum.

6. The combination of claim 1 wherein said roof skin is made of fiberglass reinforced plastic.

7. The combination of claim 1 wherein said roof skin is made of a plastic.

8. The combination of claim 1 wherein adjacent innermost boards abut but are not directly secured to each other and are retained as an integrated roof construction by being adhesively secured to said one-piece roof skin.

9. The combination of claim 1 wherein the vehicle body is an intermodal container.

10. An intermodal container including interconnected sidewalls and a roof, each sidewall comprised of panels of predetermined width and a height substantially equal to that of the container, each panel including an outer steel sheet adhesively secured to an inner plywood sheet, the front edges of the steel and plywood sheets of each panel being flush whereas the rear edge of said steel sheet extends beyond that of said plywood sheet to form a recess, the front flush edges of one panel fitting into said recess of an adjacent panel to form a lap joint and vertically spaced fasteners securing adjacent panels through said lap joints, said roof including inner plywood boards of predetermined width and length substantially equal to the width of said container and a one-piece seamless water-impervious outer roof skin adhesively secured to said plywood boards substantially coextensive with said container.

11. The container of claim 10 including end walls of the same panel construction as the sidewalls.

12. The container of claim 10 wherein said roof skin is made of aluminum.

13. The container of claim 10 wherein said roof skin is made of fiberglass reinforced plastic.

* * * * *